United States Patent

Kato et al.

[15] 3,673,892
[45] July 4, 1972

[54] KICK-DOWN CONTROL SYSTEM FOR USE IN AUTOMATIC TRANSMISSION SYSTEM OF AUTOMOBILES

[72] Inventors: Takaaki Kato, Toyohashi; Mamoru Kawakubo; Katsunori Ito, both of Kariya, all of Japan

[73] Assignee: Nippondenso Kabushiki Kaisha, Kariyashi, Aichi-ken, Japan

[22] Filed: May 11, 1970

[21] Appl. No.: 36,003

[30] Foreign Application Priority Data

May 28, 1969 Japan....................................44/41563
June 10, 1969 Japan....................................44/45526

[52] U.S. Cl..................................................74/870, 74/866
[51] Int. Cl............................................................B60k 21/00
[58] Field of Search...........................................74/866, 870

[56] References Cited

UNITED STATES PATENTS 3,019,666  2/1962  Brennan et al............................74/866
3,122,940  3/1964  Shimwell et al..........................74/866
2,519,050  8/1950  Kelbel et al..............................74/870
2,770,146  11/1956 Winkler....................................74/870
2,799,179  7/1957  Kelbel et al..............................74/870
2,839,944  6/1958  Von Rucker..............................74/866
2,857,780  10/1958 Ball et al..............................74/870 X Primary Examiner—Arthur T. McKeon
Attorney—Cushman, Darby & Cushman

[57] ABSTRACT

A kick-down control system in the automatic transmission system on automobiles comprising a switch acting to detect the position of the depressed accelerator pedal, a first NAND circuit receiving a signal corresponding to a position of the shifting mechanism, a signal corresponding to a speed of the automobile and an output signal of a second NAND circuit as the input signals, a second NAND circuit receiving an output signal from the first NAND circuit, a signal corresponding to the car speed and an output signal from the afore-said switch as the input signals, wherein the position of the shifting mechanism is determined by the output signal from the second NAND circuit.

8 Claims, 4 Drawing Figures

KICK-DOWN CONTROL SYSTEM FOR USE IN AUTOMATIC TRANSMISSION SYSTEM OF AUTOMOBILES

BACKGROUND OF THE INVENTION

1. Field of the Invention

This invention relates to a kick-down control system to realize the so-called kick-down action through an electrical circuit for use in automatic transmissions on automobiles where the gear shifting is done electrically. The kick-down herein means depressing the accelerator pedal for rapid acceleration of the travelling car to increase the engine output, while simultaneously down-shifting to the next gear to increase the output torque.

2. Description of the Prior Art

The conventional kick-down control system in automatic transmissions on automobiles is essentially of the mechanical type, relying on hydraulic pressure for its operation, because the automatic transmission is operated mechanically by means of hydraulic pressure.

As hydraulic pressure is used, the construction of the automatic transmission and kick-down control system is bulky, heavy and complicated. Also, precise operation with rapid response characteristic cannot be expected.

To solve these problems there have recently been developed various automatic transmission systems where the absolute gear shifting is electrically performed. Such an automatic transmission naturally requires a kick-down control system, whose operation is totally electrical. Though there have been contemplated and proposed such various kick-down control systems, they still cannot overcome the above problems in the automatic transmission.

SUMMARY OF THE INVENTION

An object of the invention is to overcome the above problems by the provision of a kick-down control system, whose operation is totally electric, and thus highly precise, rapidly respondable and reliable, and which is small in size and simple in construction, comprising a kick-down switch acting to detect the position of the accelerator pedal pushed down on, a first NAND circuit receiving three signals, namely a signal corresponding to a position of the gear-shift mechanism, a signal corresponding to a car speed and an output signal of a second NAND circuit, a second NAND circuit receiving three signals, namely an output signal from the first logic circuit, a signal corresponding to a car speed and an output signal of the kick-down switch, wherein the position of the gear-shift mechanism is determined by the output signal of the second NAND circuit. The kick-down switch acting to detect the position of the accelerator pedal desirably generates a kick-down signal (electrical signal) when the opening of the throttle valve is relatively small in case the engine output is low and the engine speed is low, and it desirably generates a kick-down signal (electric signal) when a relatively large opening of the throttle valve is reached in case the engine output is high and the engine speed is high.

Thus, another object of the invention is to provide a kick-down control system meeting the above requirements.

As the kick-down control system according to the invention comprises a kick-down switch acting to detect the position of the accelerator pedal pushed down on, the first NAND circuit receiving the three signals, that are a signal corresponding to a position of the gear shift mechanism, a signal corresponding to a car speed and an output signal of the second NAND circuit, the second NAND circuit receiving the three signals, that are an output signal from said first NAND circuit, a signal corresponding to a car speed and an output signal from the kick-down switch, whereby to determine the position of the gear-shift mechanism by the output signal of the second NAND circuit, the invention can feature excellent effects that the gear-shift signal for the normal driving and the kick-down signal may be determined independently of each other and entirely electrically, that a highly precise and reliable operation with excellent response characteristics can be expected, and that the entire construction of the system is simple and of very small size.

Further, the kick-down switch according to the invention has the following merits:

1. Make and break points of a relay, which is mounted in the carburetor body on the side of a magnetic shield opposite a magnet at a position fixed relative to the carburetor, faithfully corresponds to predetermined degrees of opening of a throttle valve at a constant relative position with respect to the magnetic shield.
2. The operation can be smooth, as the accelerator pedal exercises no force of reaction at the make and break of the relay contacts.
3. The throttle valve opening may be set to be large under a heavy engine load and at a high speed and small for the converse case, so that it is possible to provide a kick-down switch suited to the engine performance.
4. The construction is simple and has great durability.

DESCRIPTION OF THE PREFERRED EMBODIMENT

The invention will now be described in conjunction with a preferred embodiment of the kick-down system according thereto with reference to FIGS. 1 and 2.

In the introduction into the description of the preferred embodiment of the invention, the mechanical construction of the automatic transmission of an electrically operated type, to which the invention pertains, comprises a torque converter, a multi-band clutch and planetary gear sets, and in which electrical signals corresponding to driving conditions determine points of gear shifting for energizing and de-energizing electromagnetic solenoids of on-off valves to pen and close the hydraulic pressure circuit.

Figure 1:
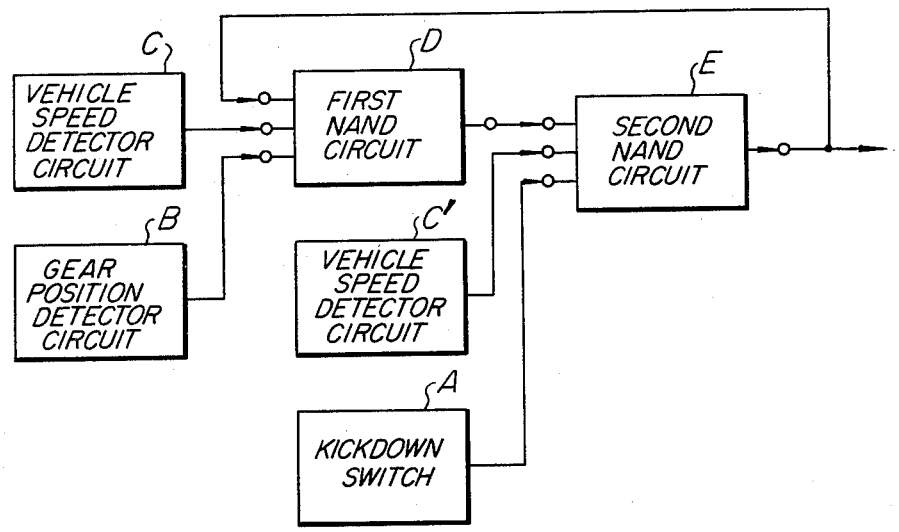
FIG. 1 is a block diagram outlining the circuit construction of the kick-down system according to the invention.

FIG. 1 outlines the control system according to the invention as applied in the above automatic transmission system. It comprises a kick-down switch A acting to detect the position of the accelerator pedal pushed down on, a gear position detector circuit B to generate a signal corresponding to a position of the gears, vehicle speed detector circuits C and C', a first NAND circuit D receiving three output signals respectively from the gear position detector circuit B, vehicle speed detector circuits B and a second NAND circuit E, and the second NAND circuit E receiving three output signals respectively from the first NAND circuit D, the vehicle speed detector circuit C' and the kick-down switch A.

Figure 2:
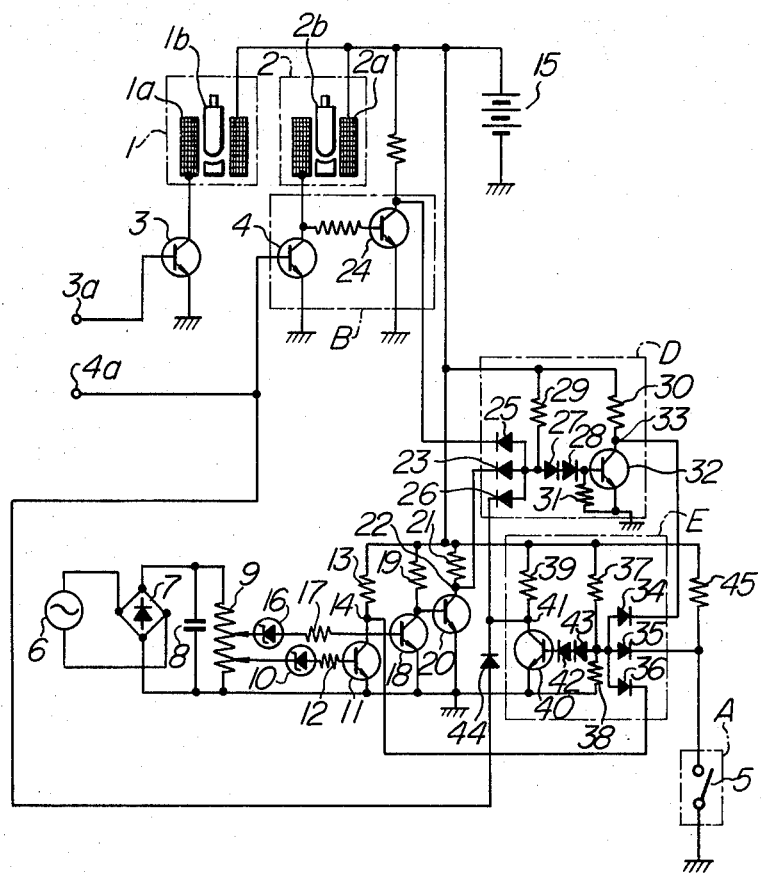
FIG. 2 is a circuit diagram of an embodiment of the kick-down system according to the invention.

To describe the individual circuits of the above control system in more detail with reference to FIG. 2, reference numerals 1 and 2 designate respective solenoid valves respectively having electromagnetic solenoids 1a and 2a for opening and closing the hydraulic pressure circuit for the shifting operation of a gear mechanism (not shown). The solenoids 1a and 2a attract respective plungers 1b and 2b by the magnetic force of attraction produced when they are energized. The gear-shift mechanism is shifted such that the first speed gear is coupled when both the solenoids 1a and 1b are not energized, the second speed gear is coupled when only the solenoid 1a is energized, and the third speed gear is coupled when both the solenoids 1a and 2a are energized. Energization and de-energization of the solenoids 1a and 2a are controlled by transistors 3 and 4 having respective base input terminals receiving signals from driving condition detector circuits detecting driving conditions of the travelling vehicle, so that the solenoid valves 1 and 2 are operated to place, for instance, the three-position gearsshift mechanism in the first, second or third speed position in correspondence to the received signals.

The kick-down action of the automatic transmission of the aforementioned type is attained when the accelerator pedal of a running vehicle in a given gear position is pushed down on to a certain deep position, whereupon a kick-down switch 5 acting to detect the accelerator pedal position is actuated (opened), so that the transmission is downshifted, in case it has been in the third speed position, for a certain period of time, during which the kick-down switch is in operation. In case the transmission is in the second position, it is maintained in that position. Thus, during the kick-down period the transmission of the running vehicle is placed in the second speed position. As the vehicle speed increases during the operation of the kick-down switch to maintain the second speed position, the engine shaft rotation goes up to a dangerous overspeed. Therefore, it is necessary to attain the forced upshifting of the kicked-down transmission from the second into the third at a certain car speed (or engine speed), which is denoted by $S_1$. In case of downshifting the transmission from the third into the second upon actuation of the kick-down switch, the overspeed of the engine shaft also results if the vehicle speed is high, so that it is required also in this case to set a critical car speed (or engine speed), which is denoted by $S_2$. $S_1$ should be higher than $S_2$ for preventing the hunting of the gear-shift mechanism, comfortability and other purposes.

An a.c. voltage proportional to the car speed (or engine speed) is generated by an a.c. generator 6, rectified by a rectifier bridge circuit 7 and smoothed by a smoothing circuit consisting of a capacitor 8 and resistor 9 to produce a d.c. voltage proportional to the car speed (or engine speed). A circuit including a Zener diode 10, a transistor 11 and resistors 12 and 13 serves to detect the aforesaid car speed $S_1$, and is combined with the a.c. generator 6, the rectifier bridge circuit 7 and the smoothing circuit to constitute the afore-mentioned vehicle speed detector circuit C'. When the car speed gets higher than $S_1$, the collector 14 of the transistor becomes to be at zero potential, while at a car speed lower than $S_1$ it is at the potential E (volts) which is substantially across a power supply 15. Also, a circuit including a Zener diode 16, resistors 17, 19 and 21 and transistors 18 and 20 takes role of detecting the car speed $S_2$, and constitutes together with the a.c. generator 6, the rectifier bridge circuit 7 and the smoothing circuit the vehicle speed detector circuit C. The collector 22 of the transistor 20 is at a potential equal to the source voltage E (volts) with a car speed higher than $S_2$ and at zero potential with a car speed lower than $S_2$.

The operation of the above circuit construction in case of a vehicle running with the transmission placed in the third speed position is now described. When the vehicle speed S is less than or equal to $S_2$, the zero collector potential of the transistor 20 is impressed upon a diode 23, so that the first NAND circuit including the diode 23, diodes 25, 26, 27 and 28, resistor 29, 30 and 31 and a transistor 32 produces, when kick-down switch 5 is actuated (opened), a signal "1" at a terminal 33 to be impressed upon a diode 34. Also, upon the actuation of the kick-down switch 5, signal "1" is impressed through a resistor 45 upon a diode 35. A diode 36 receives output from the transistor 11. Since S ≦ $S_2$, signal "1" is impressed upon the diode 36 because of the afore-mentioned requirement $S_1$ > $S_2$. As a result, zero potential, i.e., signal 0, appears at an output terminal 41 of the second NAND circuit including the diodes 34, 35 and 36, diodes 42 and 43, resistors 37, 38 and 39 and a transistor 40. This zero potential is impressed through a diode 44 upon the base terminal of the transistor 4 to cut off the transistor 4, thus cutting current off the solenoid 2a of the electromagnetic solenoid valve 2 to downshift the transmission from the third into the second, that is, to give a kick-down to the transmission. The kicked-down state is maintained as the car speed S increases in a range $S_2$<S<$S_1$, until S becomes equal to $S_1$, whereupon the collector potential of the transistor 11 becomes zero to provide signal "0" to the diode 36 of the second NAND circuit E, whose output terminal 41 thus provides signal "1" to trigger the transistor 4, causing current to flow through the solenoid 2a of the electromagnetic solenoid valve 2 to render the same operative again, thus regaining the third speed position of the transmission.

When S of the automobile, which is travelling with the transmission placed in the third, is higher than $S_2$, signal "1" is fed to the diode 23, since the collector 22 of the transistor 20 is at the source voltage E (volts), and since the condition that the solenoid 2a of the electromagnetic solenoid valve 2 carries current and is operative is detected by the afore-mentioned gear position detector circuit B including the transistor 4 and a transistor 24, that is, since the transistor 4 carries current, so that signal "1" appears at the collector of the transistor 24 to be impressed upon the diode 25. Also, the diode 26 has been receiving signal "1," until the actuation of the signal switch 5, since signal "1" has been present at the output terminal 41 of the second NAND circuit E from the closure of the kick-down switch regardless of the condition of the other inputs to the second NAND circuit E. Then, the first NAND circuit D produced signal "0" at the terminal 33 to be fed to the diode 34 of the second NAND circuit E. Thus, upon the actuation of the kick-down switch under this condition signal "1" still remains at the terminal 41 of the second NAND circuit E regardless of the condition of the other inputs to the second NAND circuit E. In consequence, the kick-down or forced downshift is not given if S < $S_2$.

Next, the operation is described in case the transmission is not in the third speed position. So long as the car speed S is less than $S_1$ after the transmission is kicked down to the second, the diode 25 is given signal "0" from the collector of the transistor 24 from the condition that the solenoid 2a of the electromagnetic solenoid valve 2 is off, so that the signal "1" is present at the output terminal 33 of the first NAND circuit D regardless of the condition of the second NAND circuit E, which has the diode 36 fed with signal "1." When the kick-down switch is actuated under this condition, the second NAND circuit E produces signal "0" at its output terminal 41. Thus, even if a speed change signal dictating the upshift into the third is given by the driving condition detector circuit, the transmission is not shifted up to the third but is maintained in the kicked-down second speed position, as the signal "0" at the output terminal 41 of the second NAND circuit E takes precedence to the afore-mentioned speed change signal. When the car speed S becomes equal to $S_1$, the transistor 11 is triggered to cause the signal "0" to be impressed upon the diode 36 of the second NAND circuit E, thus causing signal "1" at the output terminal 41 of the second NAND circuit, regardless of the condition of the other circuits to drive the solenoid 2a of the electromagnetic solenoid valve 2 by the signal impressed upon the input terminal 4a connected to the base of the transistor 4 so as to attain upshift from the second into the third.

Although in the foregoing embodiment the kick-down is given in the case of the transmission having three speed positions, it is of course possible to construct a kick-down control system of the transmission having two speed positions, which gives the kick-down from the second into the first and forces the upshift into the second when the car speed (or engine speed) exceeds a certain value as well as causing no kick-down action upon actuation of the kick-down switch if the car speed (or engine speed) of the car travelling with the transmission in the second exceeds a certain value, after the preceding embodiment of the kick-down control system that accomplishes kick-down from the third speed position.

The kick-down switch according to the invention is now described with reference to FIGS. 3 and 4.

Figure 3:
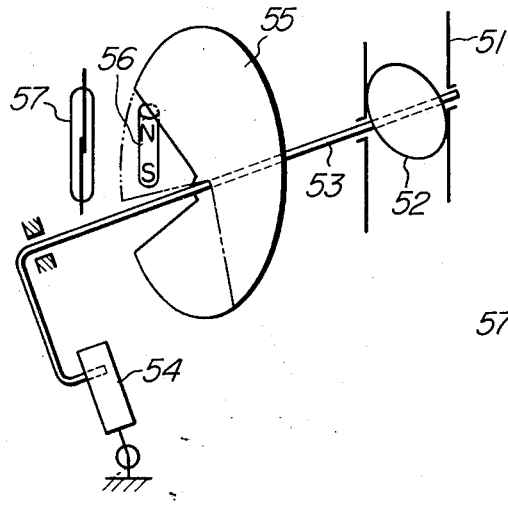
FIG. 3 is a schematic view showing the construction of a kick-down switch embodying the invention.
Figure 4:
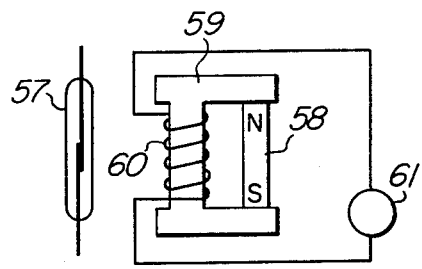
FIG. 4 shows the construction of a modification of the kick-down switch of FIG. 3.

Referring to FIG. 3, reference numeral 51 designates the carburetor communicating with the intake manifold, and numeral 52 designates a throttle valve secured to a throttle bar 53 well known in the art. The throttle bar 53 is linked to the accelerator pedal 54. It is provided with a magnetic shield 55 secured thereto and made of a ferromagnetic material. The magnetic shield 55 is formed with a sector-shaped notch, and is rotatable at a constant angle relative to the throttle valve 52. A magnet 56 is secured to the carburetor 51 on the side of the magnetic shield 55 opposite a relay contact pair 57 also secured to the carburetor 51. The magnet 56 and the relay contacts 57 are free from contact with the magnetic shield. The relay contacts 57, which are operated by the leakage flux of the magnetic field set up by the magnet 56, are preferably housed in a suitable sealed casing containing suitable gas introduced in order to prevent wear and stain thereof to constitute the usually so-called lead relay.

In the operation of the kick-down switch of the above construction, when the opening of a throttle valve 52 is small, the magnetic shelter 55 intervenes between the magnet 56 and the relay contacts 57 to shelter the leakage magnetic flux by the magnet 56 from the relay contacts 57 to open the same. When the throttle valve opening is increased, the magnetic shelter 55 is released from between the magnet 56 and the relay contacts 57 to close the contacts 57 by the forces of the leakage magnetic flux.

The method of changing the throttle valve opening for the kick-down in correspondence to the engine output or engine speed is now described. Referring to FIG. 4, the magnet 56 of FIG. 3 is replaced by an arrangement comprising a magnet 58 and yoke 57 constituting a magnetic path and wound with a coil 60 connected across a supply source 61. The yoke 59 has a U-shaped configuration to minimize the leakage magnetic flux established by the magnet 58. When the coil 60 carries d.c. current, it produces magnetic flux of the opposite direction to the magnetic flux produced by the magnet 58 to provide leakage flux, which decreases with decrease in current through the coil 60. When the leakage flux is increased, the magnetic shelter 55 is sufficiently sheltered, so that the relay contacts 57 remain closed until the throttle valve opening is reduced to a very small value. In other words, the relay contacts 57 remain closed even with a small opening of the throttle valve. On the other hand when the leakage flux is decreased, the relay contacts 57 are not closed unless the shelter 55 becomes sufficiently far apart. The power supply 61, which feeds the coil 60 to provide varying leakage flux, may be the one generating d.c. voltage proportional to the engine speed, or alternatively the one supplying reduced coil current with increase in the engine boost pressure (engine output). Most preferably, it can cause large current under conditions high speed low load and small current under conditions of low engine speed and high load in dependence upon the relation between the engine speed and the engine boost pressure.

Though in the foregoing embodiment the magnetic shelter 55 is a disk having a sector-shaped notch, it may be in other forms, for instance a rectangular plate. Also, the relay contacts 57, which is of the normally open type in the foregoing, may be of the normally closed type opened only when placed in the leakage field.

We claim:

1. A kick-down control system for use in automatic transmission systems of automobiles, which comprises a gear position detector circuit generating a gear position signal corresponding to a position of the gear-shift mechanism; a vehicle speed detector circuit generating two vehicle speed signals proportional to the vehicle speed; a kick-down switch acting and detecting the position of the accelerator pedal pushed down on to generate a kick-down signal; a first NAND circuit receiving said gear position signal, the first of said two vehicle speed signals, and an output signal from a second NAND circuit; said second NAND circuit receiving an output signal from said first NAND circuit, the second of said two vehicle speed signals and said kick-down signal; wherein the output signal from said second NAND circuit determines the position of the gear-shift mechanism.

2. A kick-down control system for use in automatic transmission systems of automobiles according to claim 1, wherein said gear-shift mechanism is adapted to be shifted down to the next gear when a first predetermined automobile speed is reached and is subsequently shifted up to the next gear when a second predetermined automobile speed, which is higher than said first automobile speed, is reached.

3. A kick-down control system for use in automatic transmission systems of automobiles according to claim 1, wherein said gear position signal is produced in response to energization or de-energization of an electromagnetic solenoid of a solenoid valve until for opening and closing a hydraulic pressure circuit to shift said gear mechanism.

4. A kick-down switch for use in a kick-down control system according to claim 1, which comprises a magnetic shield movable in correspondence to the throttle valve opening, a magnet fixed in position with respect to the carburetor body, and relay contacts disposed on the side of said magnetic shield opposite said magnet and operated by leakage magnetic flux produced by said magnet, said magnetic shield being movable between said magnet and said relay contacts.

5. A kick-down switch for use in a kick-down control system according to claim 1, which comprises a magnetic shelter movable in correspondence to the throttle valve opening, a magnet fixed in position with respect to the carburetor body, and relay contacts disposed on the side of said magnetic shelter opposite said magnet and operated by leakage magnetic flux produced by said magnet, wherein the leakage magnetic flux set up by said magnet is variable with change in at least one of the engine output and engine speed to cause corresponding movement of said shelter between said magnet and said relay contacts so as to operate said relay contacts.

6. A kick-down control system for use with an electrically actuated automatic transmission system for an accelerator operated vehicle wherein the transmission has means for generating electric signals of shifting gear-position corresponding to the vehicle condition and means for driving a gear shift mechanism in response to the signal of said means, said system comprising:
    means for generating a signal corresponding to a gear position,
    means for generating two different speed signals respectively corresponding to two predetermined vehicle speeds,
    means for generating a kick-down signal when the accelerator is pushed down,
    a first NAND circuit, and
    a second NAND circuit,
    said first NAND circuit receiving the signal corresponding to the gear position, one of said speed signals, and an output signal of said second NAND circuit,
    said second NAND circuit receiving an output signal of said first NAND circuit, the other of said two speed signals, and said kick-down signal,
    wherein the output signal of said second NAND circuit affects said means for driving to attain the kick-down.

7. A kick-down control system for use with an electrically actuated automatic transmission system of automobile according to claim 6, wherein the kick-down is attained when the first of said two signals is reached and is subsequently canceled when the second of said two signals is reached which is higher than the first.

8. A kick-down control system for use with electrically actuated automatic transmission system of automobile including means for generating electric signals of shifting gear position corresponding to the vehicle condition and means for driving a gear shift mechanism having electro magnetic solenoid values in response to the signal of said means, which comprises
    means for generating a signal in response to energization and de-energization of one of said electro-magnetic solenoid values,
    means for generating an electric voltage proportional to the vehicle speed,
    means for generating a first predetermined speed signal when the voltage attains a first predetermined value, means for generating a second predetermined signal when the voltage attains a second predetermined value which is higher than the first,
means for generating a kick-down signal when the accelerator is pushed down,
a first NAND circuit, and
a second NAND circuit,
said first NAND circuit receiving the signal corresponding to the gear position, the first of two signals corresponding to the vehicle speeds, and an output signal of said second NAND circuit,
said second NAND circuit receiving an output signal of said first NAND circuit, the second of said two signals corresponding to the vehicle speeds, and said kick-down signal,
wherein the output signal of said second AND circuit affects said means for driving to energize and de-energize the one of said electro-magentic solenoid value.

* * * * *